United States Patent [19]
Pachomoff

[11] Patent Number: 5,238,206
[45] Date of Patent: Aug. 24, 1993

[54] REAR HANGING STRUCTURE FOR A TURBOJET ENGINE

[75] Inventor: Guy R. Pachomoff, Corbeil Essonnes, France

[73] Assignee: Societe Nationale d'Etude et de Construction de Moteurs d'Aviation "S.N.E.C.M.A.", Paris, France

[21] Appl. No.: 929,830

[22] Filed: Aug. 14, 1992

[30] Foreign Application Priority Data

Aug. 14, 1991 [FR] France .................. 91 10323

[51] Int. Cl.⁵ .............................................. B64D 27/00
[52] U.S. Cl. ................................... 244/54; 248/554; 248/555; 60/39.31
[58] Field of Search .................. 244/54; 248/554–557; 60/39.31

[56] References Cited

U.S. PATENT DOCUMENTS

| | | |
|---|---|---|
| 2,818,225 | 12/1957 | Kent .................................. 248/554 X |
| 4,634,081 | 1/1987 | Chee ..................................... 244/54 |
| 4,725,019 | 2/1988 | White ................................... 244/54 |
| 5,078,342 | 1/1992 | Langley et al. ........................ 244/54 |

FOREIGN PATENT DOCUMENTS

| | | |
|---|---|---|
| 2599708 | 12/1987 | France . |
| 1236917 | 6/1971 | United Kingdom . |
| 2049817 | 12/1980 | United Kingdom . |
| 8502596 | 6/1985 | World Int. Prop. O. . |

*Primary Examiner*—Joseph F. Peters, Jr.
*Assistant Examiner*—Christopher P. Ellis
*Attorney, Agent, or Firm*—Oblon, Spivak, McClelland, Maier & Neustadt

[57] ABSTRACT

The rear hanging structure by which a turbojet engine is suspended from a mast under the wing of an aircraft includes a brace which is fixed to the mast and to which the engine is attached by at least three suspension links, the brace includes two parts which are fitted one within the other and are dimensioned in such a way as to ensure that each is able to take all of the suspension stresses independently of the other, the pins by which the brace is connected to the mast and to the suspension links passing through both parts of the brace. The redundancy thus achieved increases considerably the reliability of the suspension.

5 Claims, 2 Drawing Sheets

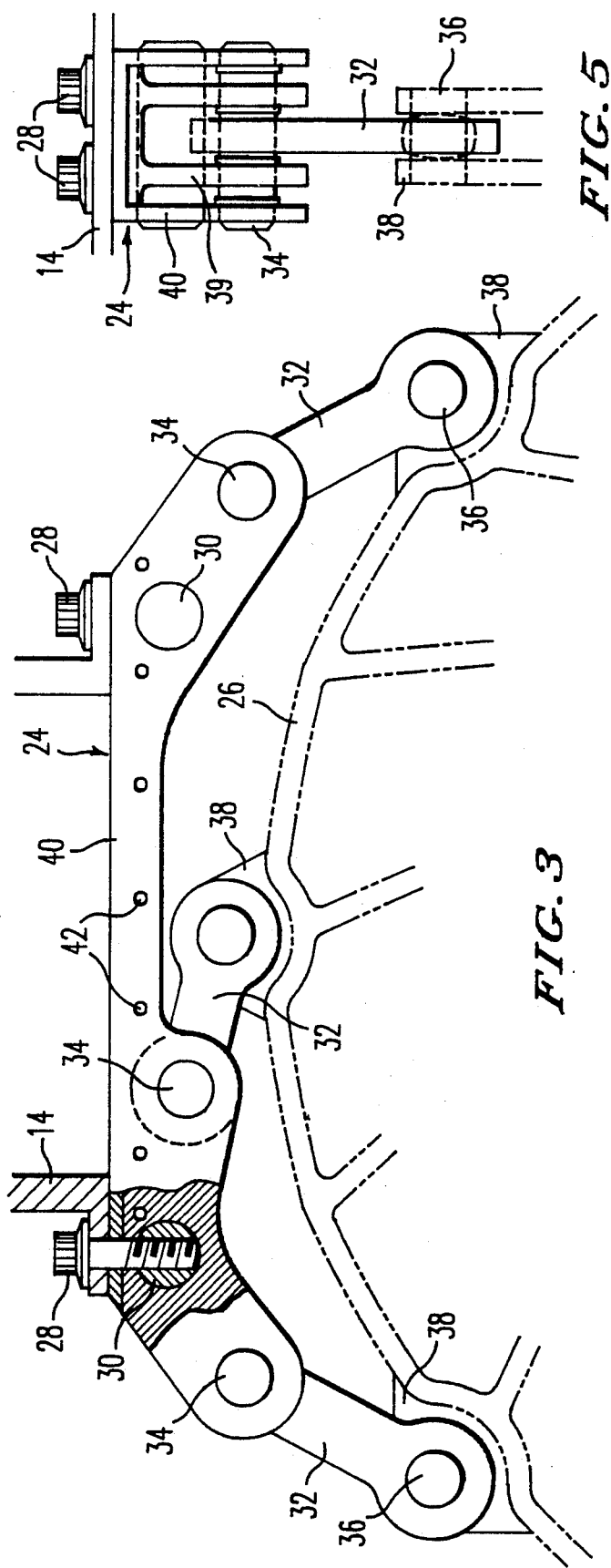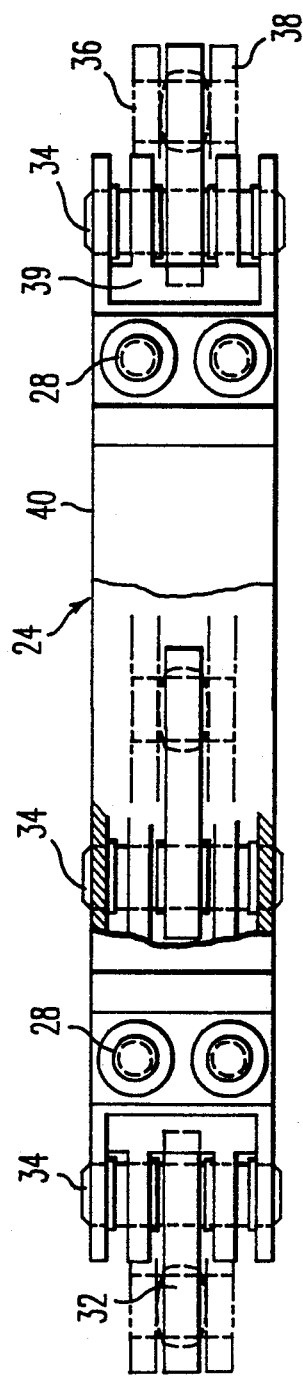

REAR HANGING STRUCTURE FOR A TURBOJET ENGINE

BACKGROUND OF THE INVENTION

1. Field of the Invention

The invention relates to a rear hanging structure for the suspension of a turbojet engine from a mast situated under the wing of an aircraft.

2. Summary of the Prior Art

The hanging of a turbojet engine under the wing of an aircraft may be effected by means of a mast designed to ensure the mechanical transmission of stresses between the engine and the structure of the aircraft. The turbojet engine is suspended from the mast at two points defining a front suspension and a rear suspension. The transmission of the actual thrust forces is achieved by means of inclined thrust take up bars situated on both sides of the engine.

The rear suspension normally comprises at least three outer hanging lugs or yokes which are formed integrally with the upper part of the exhaust casing of the turbojet engine. These lugs allow the exhaust casing to be secured to the lower ends of three suspension links which have their upper ends mounted on a substantially arc-shaped hanging member secured directly under the mast for carrying the engine.

Normally, the arc-shaped rear hanging member comprises a single piece brace to which each link is attached by a horizontal suspension pin. The brace itself is fixed under the mast by screws which are received in two horizontal suspension pins passing through the brace.

French Patent No. 2 599 708 considers the possibility of accidental breakage of one of the links by which the turbojet engine is suspended from the brace of the rear hanging structure, indicating that such a breakage could lead to the total break away of the engine or, at least, to damage to the inclined thrust take-up bars which are situated on opposite sides of the engine. To avoid this problem, it has been proposed to supplement the three suspension links normally used by a fourth link, termed a safety link, which performs a mechanical support role only if one of the three primary suspension links is broken.

However, while Specification No. FR-A-8608336 proposes a satisfactory solution to the problem posed by the breakage of one of the three suspension links by which the turbojet engine is suspended from the brace secured under the mast, it is not concerned with the case where failure of the rear suspension would result from a breakage of the one piece brace normally used. While the occurrence of such a breakage would appear more improbable than the breakage of one of the suspension links, the risk of it leading to the total breaking away of the engine would be much greater.

SUMMARY OF THE INVENTION

It is an object of the invention to provide a hanging structure in which the total breaking away of the engine will be avoided in the event of a mechanical break in the brace.

To this end, according to the invention, there is provided a rear hanging structure for suspending a turbojet engine from a mast carried by an aircraft, said structure comprising a brace designed to be fixed under said mast, at least two first suspension pins passing through said brace for connecting said brace to said mast, suspension links for attachment to the exhaust casing of said turbojet engine, and at least three second suspension pins passing through said suspension links and said brace to connect said suspension links to said brace, wherein said brace comprises at least two parts fitted one within the other and said first and second suspension pins pass through each of said at least two parts of said brace, each said part being dimensioned so as to enable it to take all of the stresses transmitted between said casing and said mast.

Since the two parts of the brace are such as to ensure, independently of each other, total accommodation of the stresses which are transmitted through the rear suspension, the mechanical behavior of the suspension is ensured even if one of the two parts should break. It is therefore possible to detect the fault and to proceed with repairs during a subsequent check, without there being any risk to the aircraft during flight.

Preferably, both parts of the brace are additionally joined together by suitable joining means, such as bolts which pass through both parts.

In one embodiment of the invention, the two parts of the brace comprise an inner part having an inverted U-shaped section, and an outer part having an inverted U-shaped section overlapping said inner part. The suspension links extend into the inner part, and the second suspension pins pass through both the inner part and the outer part on both sides of the suspension links.

A preferred embodiment of the invention will now be described, by way of example only, with reference to the accompanying drawings.

BRIEF DESCRIPTION OF THE DRAWINGS

FIG. 3 is a front view on a still larger scale of the rear suspension as shown in FIG. 2.

FIG. 4 is a top plan view of the rear suspension structure illustrated in FIG. 3.

FIG. 5 is a side view of the same structure.

DESCRIPTION OF THE PREFERRED EMBODIMENTS

Figure 1:
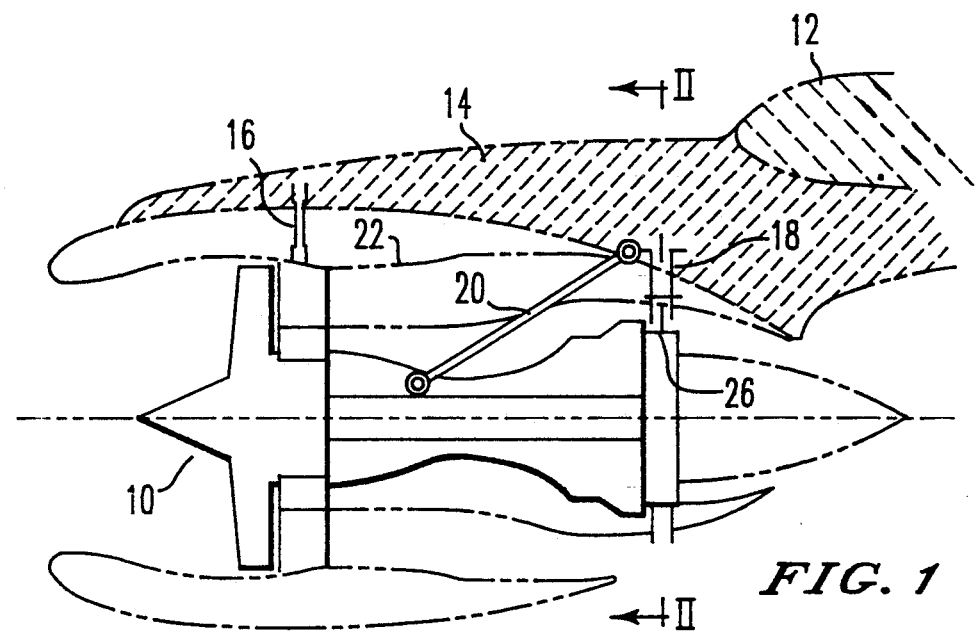
FIG. 1 is a partly sectional side view illustrating in a very diagrammatic manner the suspension of a turbojet engine under the wing of an aircraft.

FIG. 1 shows diagrammatically the suspension of a turbojet engine 10 under the wing 12 of an aircraft, the engine being suspended from a mast 14 which projects forward below the leading edge of the wing 12.

The turbojet engine 10 is suspended from the mast 14 by a front suspension structure 16 and a rear suspension structure 18 permitting demounting of the engine when this is necessary. The connection between the engine 10 and the mast 14 is completed by thrust take-up bars 20 situated on opposite sides of the engine, and through which the thrust exerted by the engine is transmitted by the mast 14 to the wing 12 of an aircraft.

The front suspension structure 16 of the turbojet engine 10 normally comprises suspension links (not shown) which hang from the front part of the mast 14 and which are secured at their lower ends to the casing 22 of the engine.

Figure 2:
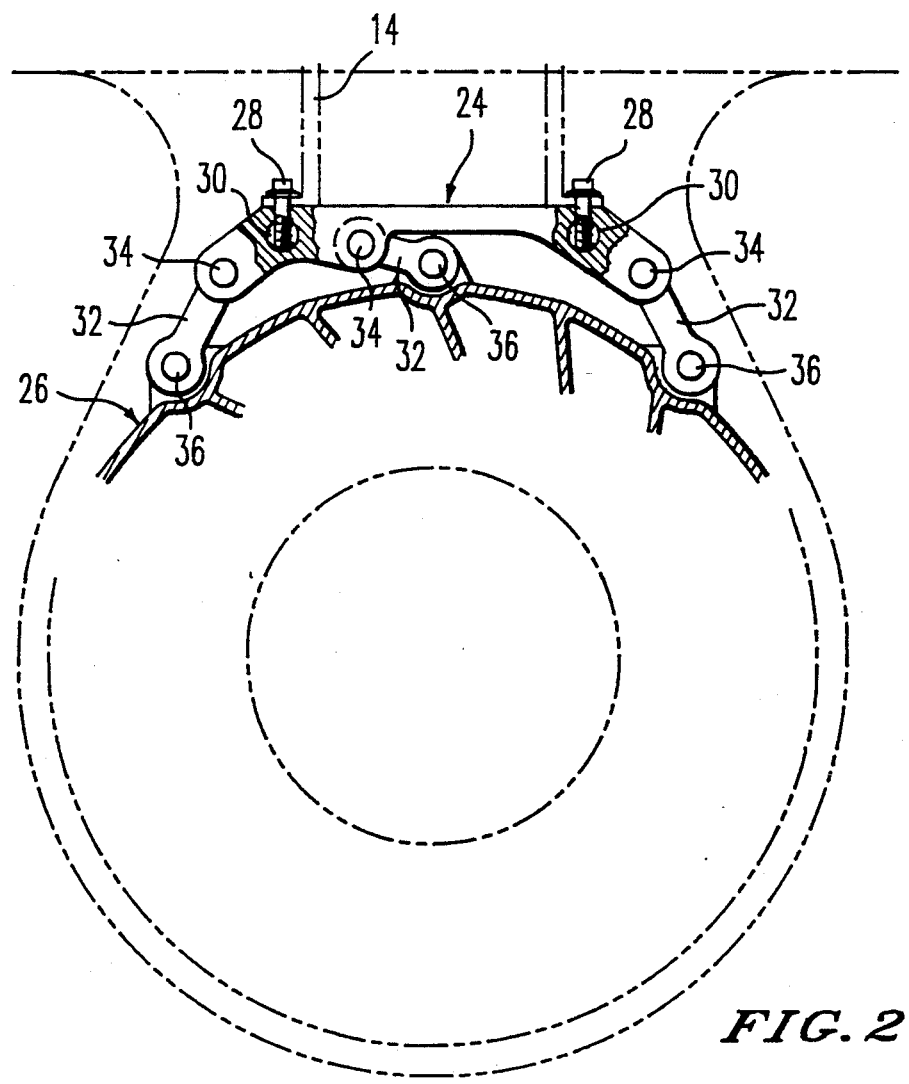
FIG. 2 is a partly sectional view taken along line II—II of FIG. 1, illustrating on a larger scale the rear suspension of the turbojet engine.

The rear suspension structure 18, which is the subject of the present invention, includes, as shown in greater detail in FIGS. 2 and 3, a hanging structure formed by a substantially arc-shaped brace 24. This brace 24 is disposed in a substantially transverse plane relative to the longitudinal axis of the turbojet engine 10 and straddles the upper part of the engine above the exhaust casing 26. The brace 24 is fastened under the mast 14 by screws 28 which engage in horizontal suspension pins 30 passing through the brace.

The exhaust casing 26 is suspended from the brace 24 by means of three suspension links 32. If desired, a safety link may also be included in conformity with the teachings of Specification No. FR-A-8608336. More precisely, the upper end of each of the suspension links 32 is connected to the brace 24 by a horizontal suspension pin 34 which passes through both the brace and the link. The connection of the exhaust casing 26 to the lower ends of the links 32 is also effected by horizontal pins 36, these pins passing through the links 32 and also through lugs or yokes 38 formed integrally on the outside of the exhaust casing 26.

When the turbojet engine is mounted, the three lugs or yokes 38 are situated so that one of them lies in the vertical plane passing through the longitudinal axis of the engine, and the other two are disposed symmetrically on opposite sides of this plane.

The brace 24 of the hanging structure will now be described in greater detail with reference to FIGS. 3 to 5.

In accordance with the invention, the brace 24 is composed of two parts 39 and 40 which are designed and dimensioned so that each, independently of the other, can ensure the total take-up of the stresses transmitted between the exhaust casing 26 and the mast 14. More precisely, the brace comprises an inner part 39 which is substantially arc-shaped and has a cross-section in the shape of an inverted U, and also includes an outer part 40 which is also substantially arc-shaped with a cross-section in the form of an inverted U. The inner part 39 is fitted in the outer part 40 so that the latter straddles and overlaps the inner part.

So that each of the two parts 39 and 40 can ensure the take-up of the stresses, each of the suspension pins 30 by means of which the brace is fixed under the mast 14 passes through both the inner part 39 and the outer part 40 of the brace. Similarly, each of the pins 34 by means of which the suspension links 32 are connected to the brace also passes through both the inner part 39 and the outer part 40 of the brace.

As illustrated in FIGS. 4 and 5, the brace 24 is symmetrical relative to a central plane oriented perpendicularly to the longitudinal axis of the engine, and each of the suspension links 32 are disposed in this central plane. Consequently, each of the suspension pins 34 passes through the corresponding link 32 within the inner part 39 of the brace, and through the side flanks of both parts 39 and 40 on each side of the link 32. This arrangement enables the transmission of the stresses between the links 32 and the brace 24 to be effected in the best possible conditions if either of the two parts 39 and 40 breaks and can no longer ensure the take-up of the stresses.

Similarly, each of the suspension pins 30 passes through the side flanks of both of the parts 39 and 40 of the brace. Two vertically disposed screws 28, arranged symmetrically relative to the above-mentioned central plane, screw into each of these pins 30 after passing through holes drilled in the parts 39 and 40, so as to connect the brace 24 to the mast 14.

As indicated in FIG. 3, the inner part 39 and the outer part 40 of the brace are also fastened together by means of bolts 42, distributed over the entire length of the brace and passing right through each of the two parts 39 and 40 parallel to the pins 30 and 34, i.e. parallel to the longitudinal axis of the engine.

Naturally, the invention is not limited to the embodiment just described, but covers all possible alternatives within the scope of the appended claims. For example, as already stated, the hanging structure may be connected to the turbojet engine by a fourth link which acts as a safety link, normally being inactive while the three suspension links are in working condition.

I claim:

1. A rear hanging structure for suspending a turbojet engine from a mast carried by an aircraft, said structure comprising:

a brace for being fixed under said mast, at least two first suspension pins passing through said brace for connecting said brace to said mast, a plurality of suspension links for attachment to the exhaust casing of said turbojet engine, and at least three second suspension pins passing through said suspension links and said brace to connect said suspension links to said brace, wherein said brace comprises at least two parts fitted one within the other and said first and second suspension pins pass through each of said at least two parts of said brace, each said part being dimensioned so as to enable it to take all of the stresses transmitted between said casing and said mast and wherein at least one of said two parts of said brace has a U-shape section.

2. A structure according to claim 1, wherein said brace further comprises at least one joining device whereby said at least two parts of the brace are joined together.

3. A structure according to claim 2, wherein said at least one joining device comprises a plurality of bolts which pass through each of said parts.

4. A structure according to claim 1, wherein said at least two parts of said brace comprise an inner part having an inverted U-shaped section, and an outer part having an inverted U-shaped section overlapping said inner part, said suspension links extending into said inner part, and said second suspension pins passing through both said inner part and said outer part on both sides of said suspension links.

5. A structure according to claim 1, wherein not more than a single pin member interconnects each of said suspension links and said exhaust casing and wherein said at least three suspension pins comprises not more than three suspension pins.

* * * * *